UNITED STATES PATENT OFFICE.

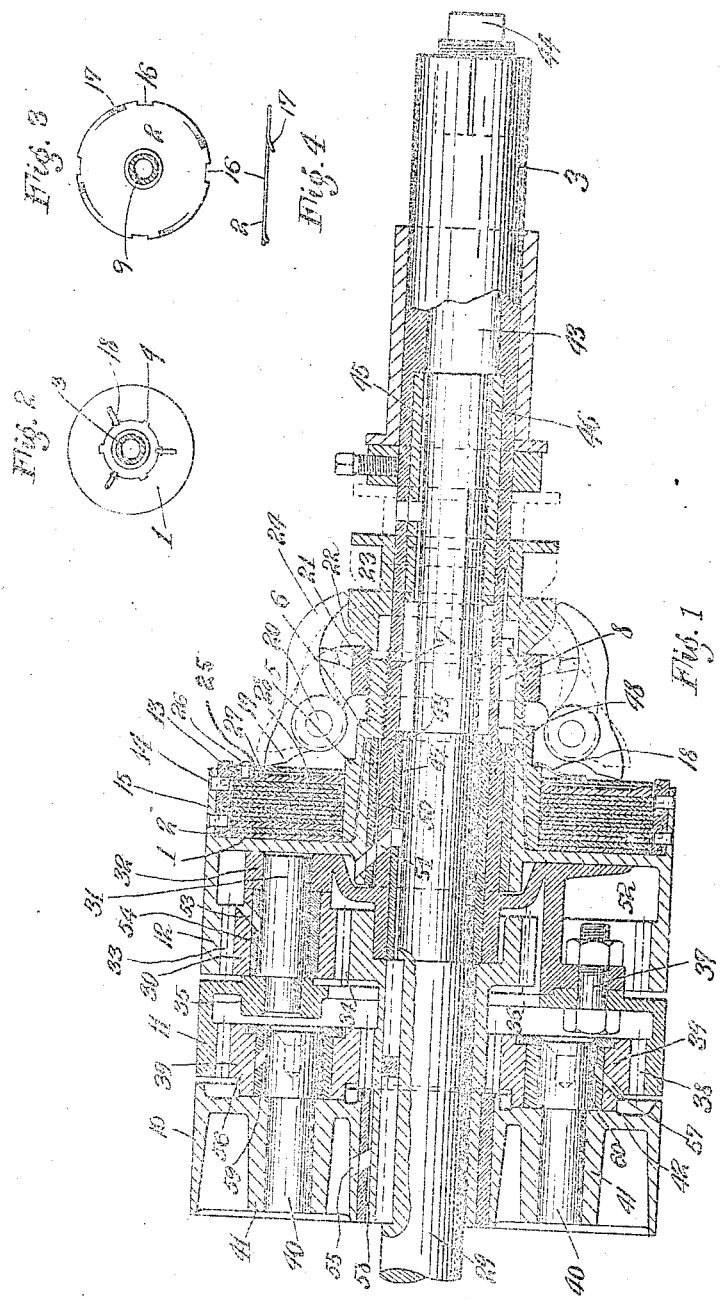

JONATHAN D. MAXWELL, OF TARRYTOWN, NEW YORK, ASSIGNOR TO MAXWELL BRISCOE MOTOR COMPANY, OF NORTH TARRYTOWN, NEW YORK, A CORPORATION OF NEW YORK.

CLUTCH AND DRUM.

No. 864,016.　　　　　Specification of Letters Patent.　　　　Patented Aug. 20, 1907.

Original application filed December 31, 1904, Serial No. 239,161. Divided and this application filed September 28, 1905. Serial No. 280,450.

*To all whom it may concern:*

Be it known that I, JONATHAN D. MAXWELL, of Tarrytown, New York, have invented certain Improvements in Clutches and Drums, of which the following description, in connection with the accompanying drawings, is a specification, like letters on the drawings designating like parts.

This invention relates to power transmitting devices and more particularly to plate clutches, and has for its special object the provision of a compact combined clutch and drum for automobile engines of the type forming the subject of my application for Letters Patent Serial No. 239,161 filed Dec. 31, 1904, and from which the subject matter of this application has been divided, although I contemplate the use in any suitable field of the various features of my invention which will be illustrated and described fully in the accompanying drawings and specification and pointed out in the claims.

In the drawings:—Figure 1 is a longitudinal sectional view of a clutch mechanism in the construction of which my improvements have been embodied, the same being shown in combination with a gear drum and shaft members, parts of which appear in elevation. Figs. 2-4 are detail views on a smaller scale, in front and side elevation respectively, of parts of the clutch shown in Fig. 1.

In the embodiment of my invention selected for illustration and description as a convenient form of construction to enable ready and complete understanding of my improvements, the clutch is formed of plates in two series 1, 2, of which the plates in series 1 are secured to the shaft member 3 through a groove 4 and feather 5 connection with a bushing 6 screwed at 7 upon the shaft 3 and keyed in place at 8.

The plates of the series 2 have central apertures 9 in which the bushing 6 and shaft member 3 are free to rotate and these are connected to a system of gear drums 10, 11, 12, through the medium of yoke members 13 bolted, riveted or otherwise suitably secured within a rim 15 of the drum 12, this rim serving to protect the clutch from entrance of oil, while the yoke members 13 lie in notches 16 in the periphery of the plates 2 (see Fig. 3).

To separate the plates of the two series when not in coöperation, separating spring devices are provided as illustrated at 17, formed from fingers bent up from the material of the plates 2, at their periphery, and additional spring members 18 may be provided to engage the shoulders of the feathers 5 on the bushing 6.

To cause operation of the clutch by throwing the plates into frictional contact, I have provided dogs 19 pivoted at 20 upon a carrier 21 screwed upon the bushing 6, a cone 22, with collar 23 constituting a convenient form of means to operate the arms 24 of the dogs 19.

To insure freedom from failure on the part of the clutch dogs in operating the clutch I have shown a disk 25 of spring steel secured loosely by rivets 26 to the outer member 27 of the plate series 1, which has an annular recess or groove 28 in its outer face, opposite the region of engagement by the dogs 19.

The dogs can be set up to crowd the spring disk normally into the recess, adjustment being effected by rotation of the carrier 21 on the bushing 6, the dogs moving during such adjustment in an annular field corresponding to the annular recess 28, and ordinary frictional wear of any of the contacting parts will be taken up automatically by the resiliency of the spring disk. By the term "dogs" I mean to designate any suitable device to perform the function served by the members 19.

In operation, the collar 23 and its cone 22 is thrown to the left, spreads the arms 24 and crowds the dogs 19 against the disk 25, and the plate series 1, which is connected by the groove 4 and feather 5 connection with the bushing 6 on the shaft 3, imparts to the latter the motion derived from the contacting plate series 2, this series being actuated by the connecting yoke members 13 upon the rotating drum 12, which in turn derives its motion from the shaft member 29 through the medium of planetary gears 30 carried by posts 31 mounted to rotate with the hub 32 of the shaft member 3.

The post 31 is connected with a boss 35 in the web 36 of the drum 11, which is further connected with the hub 32 by a bolt 37 and is supported by and rotates with the latter, having an inner peripheral rack 38 with which mesh planetary gears 39 carried by posts 40 in bearings 41 upon the web 42 of the drum 10.

Upon rotation of the shaft member 29, the shaft member 3 will be operated at low speed if the dogs 19 be released and the pulley 12 held from rotation by any suitable means, not shown, as for example the devices illustrated and described in my application for Letters Patent Serial No. 239,161 from which this present application has been divided, and to which reference may be made.

In the position shown in Fig. 1, the shaft members 3 and 29 are coupled for rotation at the same rate of speed, the gear 30 meshing with inner peripheral rack 33 upon the drum 12, and a pinion 34 upon the shaft member 29. Reverse motion at low speed of the member 3 relatively to the member 29 will be secured when the drum 10 is held from rotation, the drum 12 and dogs 19 being free.

I have provided for an efficient distribution of oil to the various bearings, by forming a supply chamber 43, (plugged at 44) in the shaft member 3, which chamber is in communication by a channel 45 in the bushing 46, a similar channel 47 in the bushing 48 and a channel 49 in the bushing 50, connected by a series of ports 51 communicating with the chamber 52 within the drum 12 and through which the oil finds access to the rack 33 and gear 30, as well as to the post 31 by a port 53 through the bushing 54.

Ports 55, 56 and 57 provide access for oil to the bushing channels 58, 59 and 60 respectively.

Having described my invention thus fully, and convenient means for carrying the same into effect, I do not limit myself to the specific means illustrated and described, nor in general otherwise than as set forth in the claims read in connection with this specification.

What I claim and desire to secure by Letters Patent is:—

1. In a plate clutch for power transmitting apparatus, driving and driven plates alternating in series, means adjustable in an annular field to maintain said plates in operative contact, and a spring wear-disk intermediate said means and plates, substantially as described.

2. In a plate clutch for power transmitting apparatus, driving and driven plates alternating in series, one of the outer plates of said series being of resilient material, and dogs to engage said outer plate to maintain said series in operative contact, said dogs being adjustable in an annular field, and the plate next to said spring plate having an annular recess opposite the region of contact of said dogs, to permit said outer plate to give under the pressure of said dogs, substantially in the manner and for the purpose described.

3. In a plate-clutch, driving and driven plates alternating in series, a driving yoke engaging said driving plates to actuate the same, and integral peripheral spring fingers formed in, and tending normally to separate, said plates, a driven axial bushing having feathers to engage and be driven by said driven plates and springs on one of said driven plates to engage said feathers and tending normally to separate said plates, substantially as described.

4. In a plate clutch for power transmitting apparatus, driving and driven plates alternating in series; a series of dogs operable to engage and force said series into frictional contact; means to adjust said dogs in an annular field; and a wear-disk presenting a resilient, annular contact surface for engagement by said dogs, substantially as described.

Signed at Tarrytown in the county of Westchester and State of New York this 1st day of September A. D. 1905.

JONATHAN D. MAXWELL.

Witnesses:
J. T. CONNELL,
C. H. KING, Jr.